United States Patent [19]
Martin et al.

[11] Patent Number: 5,719,674
[45] Date of Patent: Feb. 17, 1998

[54] PROCESS FOR MEASURING ROTATION SPEEDS ABOUT SEVERAL AXES, AND A MULTIPLEXED MULTI-AXIAL GYROFIBER ALLOWING THIS MEASUREMENT

[75] Inventors: Philippe Martin, Pontchartrain; Thierry Gaiffe, Paris; Joël Morisse, Saclay; Pascal Simonpietri, Saint-Brice-sous-Foret; Hervé Lefevre, Paris, all of France

[73] Assignee: Photonetics, Marly Le Roi, France

[21] Appl. No.: 633,339

[22] Filed: Apr. 17, 1996

[30] Foreign Application Priority Data

Apr. 18, 1995 [FR] France .................. 95 04601

[51] Int. Cl.$^6$ .................................. G01C 19/72
[52] U.S. Cl. .................................. 356/350
[58] Field of Search .................................. 356/350

[56] References Cited

U.S. PATENT DOCUMENTS

| 5,184,195 | 2/1993 | Goldner ......................... 356/350 |
| 5,189,488 | 2/1993 | Mark et al. ................... 356/350 |

FOREIGN PATENT DOCUMENTS

| 0460675A1 | 12/1991 | European Pat. Off. . |
| 0504820A1 | 9/1992 | European Pat. Off. . |
| 2 605 101 | 4/1988 | France . |

*Primary Examiner*—Samuel A. Turner
*Attorney, Agent, or Firm*—Nikaido, Marmelstein, Murray & Oram LLP

[57] ABSTRACT

A process and an optical gyroscope are provided for measuring rotation speeds (S) about N axes. The light source and the photodetector are common. Controlled modulation phase differences $\delta\Phi_{c,i}$ COMPRISE biasing components $\delta\Phi_{m,i}$ (42, 45, 46) with a common modulation period $T_m$ and common amplitude. Since each half-period $T_m/2$ is divided into N time intervals $\delta t_i$, a change in the sign of the biasing component $\delta\Phi_{m,i}$ associated with each interferometer $I_i$ is produced at the beginning of one and only one $\delta t_i$ time interval. Sagnac phase shifts $\delta\Phi_{s,i}$ are obtained by sampling a signal on the N time intervals.

17 Claims, 6 Drawing Sheets

PROCESS FOR MEASURING ROTATION SPEEDS ABOUT SEVERAL AXES, AND A MULTIPLEXED MULTI-AXIAL GYROFIBER ALLOWING THIS MEASUREMENT

FIELD OF THE INVENTION

This invention relates to a process for measuring rotation speeds about several axes, and a fiber-optic interferometric gyroscope embodying this process.

BACKGROUND OF THE INVENTION

Navigation, guidance and stabilization systems usually use several rotation measurement axes: two orthogonal axes for stabilizing a line of sight, three orthogonal axes for navigation and guidance, and four or more when redundancy is necessary. Three axes are necessary to measure the angular position of a mobile. This type of system may use independent optical gyroscopes each including a source and a receiver. These devices are well known, and any required measurements can be made by placing several of them.

However it is desirable to reduce the number of components for cost, compactness and reliability reasons. This may be done by putting several elements in common between the measuring means on various axes. Several gyroscopes used to measure rotation speeds about several axes called "multiaxis gyroscopes" have recently been proposed. These gyroscopes include Sagnac ring interferometers for each measurement direction, but may use a single light source, a single photodetector or a single electronic processing unit.

The Sagnac interferometer and the physical phenomenon that it uses are well known.

In this type of interferometer, a splitting blade or other splitting device divides an incident wave. The two counter-propagating waves thus created propagate in opposite directions along a closed optical path, recombine and produce interference that depends on the phase difference between the waves when they are recombined. Originally, the closed optical path in Sagnac interferometers was defined by mirrors. It is now known that it can be created using a multi-turn coil with single-mode optical fiber.

It is also known that some physical phenomena may cause disturbances, particularly non-mutual phase shifts on counter-propagating waves generating relative phase differences between these waves which modify their interference condition during their recombination.

A measurement of the relative phase difference can quantify the phenomenon that generated it. The main physical phenomenon that can create these non-mutual disturbances is the Sagnac effect produced by rotating the interferometer about an axis perpendicular to the plane of its closed optical path. The Faraday effect, or the colinear magneto-optic effect, is also known to produce non-mutual effects of this type. Under specific conditions, other effects can also produce a non-mutual phase difference. On the other hand, variations of the many parameters representative of the environment that frequently cause measurement disturbances have only mutual effects on the Sagnac interferometer, do not disturb the relative phase difference between counter-propagating waves, and therefore have no influence on the measurement of the parameter being studied. This is the case for slow variations of temperature, index, etc., that modify the optical path traveled by waves, but modify it reciprocally.

A great deal of work has been done in an attempt to improve the sensitivity and precision of measurements that can be made with this type of measuring instrument. For example, a good reference book on this subject is "The Fiber Optic Gyroscope", published by Artech House, Hervé C. LEFEVRE, 1993.

Different methods of processing signals have been proposed in the presence of a single Sagnac interferometer. The response supplied by this interferometer is given by the interference power P as a function of phase difference $\delta\Phi$ and the shape $P=P_0(1+\cos\delta\Phi)$. $P_0$ is the maximum interference power obtained by the additive effect of counter-propagating waves in the absence of a phase shift. Now the sensitivity of this signal close to the phase difference $\delta\Phi=0$ is low. In order to correct this, it has been suggested that a square modulation of the phase difference $\delta\Phi_m$ could be introduced to shift the operating point and create a periodic signal, the amplitude of which is a sinusoidal function of the measured parameter, and that can be used with greater sensitivity and stability.

The amplitude of this phase difference $\delta\Phi_m$, called the biasing phase difference, is typically $\pi/2$. It is usually produced by putting a phase modulator at one end of the multi-turn coil on the interferometer, and it is controlled by a $V_m$ signal. This $V_m$ signal generates a phase shift $\delta\Phi_m$ on each wave which produces a phase difference between the counter-propagating waves:

$$\delta\Phi_m(t)=\Phi_m(t)-\Phi_m(t-\tau)$$

where t is time and $\tau$ is the transit duration for one of the waves in the coil.

It was then demonstrated that the measurement precision is improved by using a zero method, also called "closed loop operation". According to this method, an additional so-called "counter-reaction" phase difference $\delta\Phi_{cr}$ is applied and is used to compensate for the difference $\delta\Phi_s$ produced by the measured parameter and called Sagnac effect. The sum of these two phase differences $\delta\Phi_{cr}$ and $\delta\Phi_s$ is kept equal to zero so that the interferometer can be operated with maximum sensitivity. The measurement is made using the signal necessary to produce the counter-reaction phase difference $\delta\Phi_{cr}$. Thus the measurement itself is stable and linear.

The controlled phase difference $\delta\Phi_c$ is produced by the phase modulator controlled by a signal $V_c$. This signal $V_c$ generates a phase shift $\Phi_c$ on each wave, which produces a phase difference $\delta\Phi_c$ between counter-propagating waves:

$$\delta\Phi_c(t)=\Phi_c(t)-\Phi_c(t-\tau)$$

The modulation phase shift $\Phi_c$ comprises a counter-reaction component $\delta\Phi_{cr}$. Therefore it also has a biasing component $\Phi_m$ with a period equal to the modulation period $T_m$. This biasing component $\Phi_m$ is usually itself the sum of an oscillation term $\Phi_o$ and a constant offset term $\Phi_d$, the value of the oscillation term $\Phi_o$ at time t being opposite to its value at time $t+T_M/2$.

In the presence of several measurement axes, a single light source is used according to one known method of making a multiaxis gyroscope. It is one of the most expensive elements, and is the element that consumes most energy. Light emitted by this source can then be permanently shared, for example, with beam splitters or couplers. We then refer to "source sharing". Each interferometer is usually associated with a detector and an electronic signal processing unit.

For example, source sharing may be done using a 3×3 fiber coupler, on which one of the three input arms is connected to the common source. Each output arm of the 3×3 coupler is connected to one of the three interferometers through a 2×2 faber coupler, the second input arm of the 2×2 coupler being connected to a detector.

It has also been proposed to use optical switches to multiplex signals produced by interferometers. These switches are placed such that at any time it is possible to connect one and only one of the three interferometers to the source, and another one to the photodetector. The transit duration for a wave in any of the three interferometers is equal to $\tau$, therefore operation of the gyroscope depends on a time cycle with a duration equal to $3\tau$. This time duration is also shared into three phases, with durations equal to $\tau$ respectively.

During the first phase, the photodetector is connected to a first interferometer from which it receives a signal, while the source is connected to a second interferometer to which it sends light.

During the second phase, switches connect the photodetector to the second interferometer while the source is connected to the third interferometer, such that the photodetector receives the signal previously sent by the source into the second interferometer, while the source sends light into the third interferometer.

Similarly, during the third phase, the photodetector is connected to the third interferometer while the source is connected to the first one. Therefore the signal received by the photodetector corresponds in sequence to each of the three interferometers for a time period equal to $\tau$. This sequence is combined with a biasing modulation with a period $6\tau$ on the three interferometers.

Time multiplexing of the three signals is thus done by switching.

Although it allows common use of a single light source and a single photodetector, this type of three-axis gyroscope is penalized by its technological complexity due to the presence of optical switches. Furthermore, the fact that optical Y junctions are placed at the input of the interferometers causes a problem of reinjecting anti-symmetric mode in the presence of the switches.

FR Patent 2.605.101 describes another three-axis gyroscope making use of source sharing and multiplexing. In this patent, the three fiber coils are coupled in series and are connected to each other at the middle. Let the transit duration of a wave in any one of the interferometers be $\tau$, then a signal sent to the first coil at instant t will not reach the second coil until instant t+$\tau$ and the third at instant t+$2\tau$. Therefore the photodetector receives information from the three interferometers at instants t+$\tau$, t+$2\tau$, and t+$3\tau$ respectively. Therefore the source must send a signal at a rate of at least $3\tau$, so that output signals do not get mixed. As in the previous embodiment, this multiplexing is combined with a biasing modulation with a period $6\tau$ applied by the modulators to the three interferometers.

This device has the disadvantage of giving relatively low feedback powers due to losses in couplers connecting the interferometers. Furthermore, it is technically difficult to place three coils interconnected by couplers in the same housing orthogonally. Connection fibers to coils also make the device sensitive to the temperature gradient.

European patent EP-0.460.675 proposes another solution for a multi-axial gyroscope putting a source and photodetector in common for several interferometers.

The source is connected to an optical distribution element comprising several branches, each of these branches leading to the two ends of one of the interferometers through a beam splitter. Phase modulators placed in the beam splitters apply phase differences to counter-propagating waves passing through the interferometers.

The multiplexing procedure used with this device consists of alternatively starting up a modulation signal for each interferometer, keeping a zero signal for all other interferometers.

The major disadvantage of this method is that it introduces a continuous parasite signal. Interference from propagating waves at interferometer outputs creates maximum power when there is a zero phase difference.

One solution to avoid this problem is described in U.S. Pat. No. 5,184,195. This document relates a three-axis gyroscope with a single source and a single photodetector. The source, the photodetector and the three interferometers are connected through a network of optical fibers and couplers. Phase modulators are placed at the input to the three interferometers.

This device is used with a multiplexing process alternating a measurement modulation with an extinguishing modulation, for each interferometer. The extinguishing modulation is obtained by applying a phase modulation with amplitude $\pi$ since this is equivalent to being exactly out of phase with counter-propagating waves at the output from the interferometer, generating zero power. A measurement modulation is only applied to one of the interferometers at the same time.

This process creates a precision problem. The return power received by the photodetector varies with time, even if powers output from interferometers are balanced by installing the gyroscope. This is due to the fact that there are always differences of 10 to 20% between the various axes, these differences being amplified during demodulation of the received signals. Furthermore, since the photodetector is followed by a peak reducer and an amplifier, generated power skips can saturate the amplifier.

Another problem with this process occurs when interferometers have to be modulated at a natural frequency. Modulations have to be very fast if the natural frequency is high, and this can be difficult to implement.

Another disadvantage of the device described in the previous patent is due to the fact that the couplers used introduce large energy losses, since the power received by the photodetector is very low compared with the power emitted by the source.

SUMMARY OF THE INVENTION

The object of this invention is a reliable, precise and easy-to-use process to measure rotation speeds about several axes.

It is also intended to minimize the presence of parasite signals, while optimizing use of the input energy.

The object of this invention is thus a multi-axial interferometric gyroscope using a single-light source and allowing temporal multiplexing of signals using a common photodetector and a common electronic processing unit, without the need for a switch.

Another object of this invention is to make a multi-axial, not expensive, compact, reliable multi-axial gyroscope with low energy consumption.

Another object of this invention is to make such a gyroscope with technical complexity similar to that for source sharing.

Furthermore, an object of this invention is to carry out a closed loop processing, while maintaining perfect stability.

Accordingly, the invention relates to a process for measuring rotation speeds about N axes, where N is not less than 2, using an interferometric fiber-optic gyroscope. The gyroscope comprises N Sagnac ring interferometers $I_i$, two counter-propagating waves each propagating in each one of the interferometers $I_i$, the duration of the wave propagation time between separation and recombination being $\tau_i$, the durations $\tau_i$ associated with interferometers $I_i$ being approximately equal to a common transit time $\tau$. The process is such that:

signals are emitted by a light source common to all interferometers $I_i$, signals are detected after crossing interferometers $I_i$ in a common photodetector, phase modulators generate controlled modulation phase differences $\delta\Phi_{c,i}$ between the counter-propagating waves propagating into each interferometer $I_i$, modulators are controlled, the signals from the photodetector are demultiplexed and demodulated, and a processing unit extracts rotation speeds of interferometers $I_i$.

Signals emitted by the source reach all interferometers $I_i$, and then the photodetector almost simultaneously.

According to the invention, controlled modulation phase differences $\delta\Phi_{c,i}$ generated by modulators comprise biasing components $\delta\Phi_{m,i}$ with a common modulation period $T_m$, approximately equal to twice $2\tau$ the common transit duration $\tau$, and with a common amplitude equal to a phase bias that is not a multiple of $\pi$, the value of each biasing component $\delta\Phi_{m,i}$ at a time t being opposed to that of the component at time $t+T_m/2$, each half-period $T_m/2$ being divided into at least N time intervals $\delta t_i$. Furthermore, a sign change for the biasing component $\delta\Phi_{m,i}$ associated with each interferometer $I_i$ occurs at the beginning of one and only one of the time intervals $\delta t_i$.

In this manner, a signal reaching the processing unit is simultaneously affected by Sagnac phase shifts $\delta\Phi_{s,i}$ representing the rotation speeds of all interferometers $I_i$, and is added to the modulation phase differences $\delta\Phi_{c,i}$, Sagnac phase shifts $\delta\Phi_{s,i}$ being extracted by the processing unit by sampling the signal on N time intervals $\delta t_i$.

The modulation applied to each interferometer is thus similar to what is applied in a gyroscope with a single measurement axis. Biasing modulations are identical for all gyroscope interferometers according to the invention, but a time shift has been added.

An electronic demultiplexing and demodulation circuit placed at the output from the photodetector extracts signals from the various interferometers $I_i$.

An advantage of this multiplexing mode is that the power that photodetector received from the interferometer $I_i$ is constant.

When demultiplexing and demodulating signals from the photodetector, it is beneficial to apply demultiplexing and demodulation signals $D_i$ with a period equal to the common modulation period $T_m$, using an electronic demultiplexing and demodulation circuit of the processing unit, such that the demultiplexing and demodulation signal $D_i$ associated with each interferometer $I_i$ is equal to 1 within the time interval $\delta t_i$ during which the corresponding sign is changed, 0 from the next $\delta t_{i+1}$ interval to the $(N-2)^{th}$ $\delta t_{N+i-2}$ interval following, 1 in the $(N-1)^{th}$ $\delta t_{N+i-1}$ interval following, $-1$ in the $N^{th}$ $\delta t_{N+i}$ interval following, 0 from the $(N+1)^{th}$ $\delta t_{N+i+1}$ interval to the $(2N-2)^{th}$ $\delta t_{2N+i-2}$ interval following, and $-1$ in the next $(2N-1)^{th}$ $\delta t_{2N+i-1}$ interval.

According to one proposed embodiment, the controlled modulation phase difference $\delta\Phi_{c,i}$ generated in each interferometer $I_i$ is produced by modulators by simultaneously applying a controlled modulation phase shift $\Phi_{c,i}$ to the two counter-propagating waves propagating in interferometer $I_i$. These counter-propagating waves then recombine after a time shift equal to the transit duration $\tau$, the phase shift $\Phi_{c,i}$ determining the phase difference $\delta\Phi_{c,i}$. The modulation phase shift $\Phi_{c,i}$ comprises a biasing component $\Phi_{m,i}$, with a period equal to the modulation period $T_m$, the biasing component $\Phi_{m,i}$, being the sum of an oscillation term $\Phi_{o,i}$, and a constant offset term $\Phi_{d,i}$. The value of the oscillation term $\Phi_{o,i}$ at time t is opposite to the value at time $t+T_m/2$, the oscillation term $\Phi_{o,i}$ having an amplitude equal to half the phase bias, and changing the sign at the beginning of time interval $\delta t_i$ corresponding to interferometer $I_i$.

The phase bias is preferably equal to $\pi/2$.

This value gives maximum sensitivity of the measured signal in the presence of a phase shift produced by interferometer rotations.

All time intervals $\delta t_i$ defined in the measurement process according to the invention are advantageously the same, and are equal to 1/N of the modulation period $T_m/2$.

In particular, this time distribution facilitates attenuation of parasite effects due to overlapping responses during transitions between successive time intervals $\delta t_i$. This type of undesirable effect is essentially due to differences between transit times that occur in the different interferometers.

The regularity of intervals $\delta t_i$ makes it possible to set up methods for correcting periods $T_m/(2N)$.

According to a preferred correction method, a periodic signal processing gate is applied to an output signal arriving at the processing unit. The gate consists of an amplitude modulation with a gate period equal to 1/(2N) of the modulation period $T_m$, leaving the signal unchanged during part of each gate period centered on one of the time intervals $\delta t_i$, and cancelling it during the other part of the period. Parasite effects due to variations between the half modulation period $T_m/2$ and natural periods $\tau i$ of interferometers $I_i$ are thus attenuated.

According to another correction method, a signal emitted by the source is acted upon by an electronic modulation circuit connected to the source. This circuit applies to the signal a sequential extinction at an extinction period equal to 1/(2N) the modulation period $T_m$. Parasite effects due to variations between the modulation half-period $T_m/2$ and natural periods $\tau i$ of interferometers $I_i$ are thus attenuated.

This second means is beneficially used with the first. Since signals do not drop with an infinite slope, they can be compared with exponentials taking on the total power emitted by the source. The parasite effect thus created is minimized by switching off the source on each signal peak in order to significantly reduce the height of the exponential.

This sequential extinction is beneficially done using an electronic modulation circuit that keeps a low noise level.

According to one preferred measurement method, a possible Sagnac phase shift $\delta\Phi_{s,i}$ due to rotation of the interferometer $I_i$ and added to the biasing component $\delta\Phi_{m,i}$ of the associated controlled modulation phase difference $\delta\Phi_{s,i}$ is compensated by a counter-reaction component $\delta\Phi_{cr,i}$ of the modulation phase difference $\delta\Phi_{c,i}$, for each interferometer $I_i$. The sum $\delta\Phi_{s,i}+\delta\Phi_{cr,i}$ of the Sagnac phase shift $\delta\Phi_{s,i}$ and the counter-reaction component 67 $\Phi_{cr,i}$ is continuously servo-controlled to zero, such that rotations of interferometers $I_i$ are deduced from counter-reaction components $\delta\Phi_{cr,i}$.

This is the closed loop operation previously described for a gyroscope with a single measurement axis. Multiplexing techniques applicable to the gyroscope according to the invention are thus compatible with known counter-reaction techniques using phase ramps. These techniques can give a linear response according to the measured rotations and independently of the optical power.

The invention relates to a fiber-optic interferometric gyroscope used to measure rotation speeds about N axes, where N is not less than 2. This gyroscope comprises:

N interferometers $I_i$ in a Sagnac ring, two counter-propagating waves, propagating in each interferometer $I_i$, the wave propagation time between separation and recombination being a transit duration $\tau i$, the said durations $\tau i$ associated with interferometers $I_i$ being approximately equal to a common transit duration $\tau$, a common light source, a common photodetector, phase modulators generating controlled modulation phase differences $\delta\Phi_{c,i}$ between the counter-propagating waves propagating in each interferometer $I_i$, a processing unit controlling the modulators, receiving signals from the photodetector, demultiplexing and demodulating the said signals, and providing rotation speeds of the said interferometers $I_i$.

According to the invention, controlled modulation phase differences $\delta\Phi_{c,i}$ generated by modulators comprise biasing components $\delta\Phi_{m,i}$ with a common modulation period $T_m$ approximately equal to twice $2\tau$ the common transit duration $\tau$, and with a common amplitude equal to a phase bias which is not a multiple of $\pi$, the value of each biasing component $\delta\Phi_{m,i}$ at time t being opposed to the value of the said component at time $t+T_m/2$. Since each half-period $T_m/2$ is divided into at least N time intervals $\delta t_j$, the modulator on each interferometer $I_i$ produces a change in the sign of the associated biasing component $\delta\Phi_{m,i}$ at the beginning of one and only one time interval $\delta_{ij}$.

In this way, a signal arriving at the processing unit is simultaneously affected by Sagnac phase shifts $\delta\Phi_{s,i}$, representing rotation speeds of all interferometers $I_i$, and adding to modulation phase differences $\delta\Phi_{c,i}$. The processing unit extracts these Sagnac phase shifts $\delta\Phi_{s,i}$ by signal sampling on the N time intervals $\delta t_j$.

According to a preferred embodiment of the gyroscope according to the invention, it comprises a set of couplers connecting the source, the photodetector and interferometers $I_i$. All couplers have N input gates and N output gates, one input gate being connected to the source and N−1 input gates being connected to the photodetector, and the N output gates being connected to the interferometers $I_i$ respectively.

With this type of device, a signal output from the source is split into N signals which arrive at all interferometers practically simultaneously and which, after passing through the interferometers, reach the photodetector at approximately the same time since the transit durations are approximately the same for all interferometers.

Furthermore with this device, each interferometer can receive the same light power originating from the source, and also the photodetector will receive the same light power output from each interferometer.

The presence of phase modulators makes multiplexing possible without being as complex in use as optical switches.

In a first configuration of this preferred embodiment of the gyroscope according to the invention, the gyroscope comprises a single coupler with N input gates and N output gates.

In a second configuration, couplers each have two input gates and two output gates and form a tree structured set.

It is then beneficial to use polarization holding couplers, for example made by lateral polishing of a fiber, with a light source emitting polarized light such as a superluminescent diode. This type of source is very economical.

Alternatively, a fiber source doped with a rare earth such as Neodyme or Erbium, called a superfluorescent fiber source, could be used with ordinary fiber couplers without maintaining polarization.

In a preferred design of this second configuration, the gyroscope comprises two interferometers and a coupler, this ½, ½ coupler sharing incident power on a first input gate connected to the source, into two powers transmitted respectively to the two output gates connected to the two interferometers, each equal to half of the incident power.

In this way, both interferometers each receive the same light power and signals output from interferometers and received by the photodetector are balanced.

In another preferred design of this second configuration, the gyroscope comprises three interferometers and two couplers. The first of these couplers has two input gates, one connected to the source and the other to the photodetector respectively, one output gate connected to the first of the interferometers and another output gate connected to a first input gate of the second coupler. The second ½, ½ coupler has a second input gate connected to the photodetector and output gates, each of which is connected to one of the other two interferometers, respectively. The first ⅓, ⅔ coupler shares incident power on the input gate connected to the source, into a first part of the power transmitted to the output gate connected to the first interferometer equal to one third of the incident power, and to a second part of the power transmitted to the output gate connected to the first input gate of the second coupler, equal to two thirds of the incident power.

In this way, the three interferometers each receive the same light power and signals output from interferometers and received by the photodetector are balanced.

The optical path between an interferometer and a coupler being greater than the source coherence length, the waves from the different interferometers are non-coherent and cannot interfere.

Polarizers are beneficially inserted between couplers and interferometers $I_i$.

Moreover, the gyroscope according to the invention may usefully be coupled to other gyroscopes.

In particular, it is useful for it to be coupled to a second gyroscope according to the invention through a coupler comprising two input gates and two output gates. The two input gates are connected respectively to the two gyroscope light sources, and the two output gates are connected respectively to the two gyroscopes, and send optical signals to them.

A double source and a double photodetector are thus used redundantly in a configuration with four measurement axes.

BRIEF DESCRIPTION OF THE DRAWINGS

The invention will be described in more detail with reference to the drawings, in which.

DETAILED OF THE PREFERRED EMBODIMENT

Figure 1:
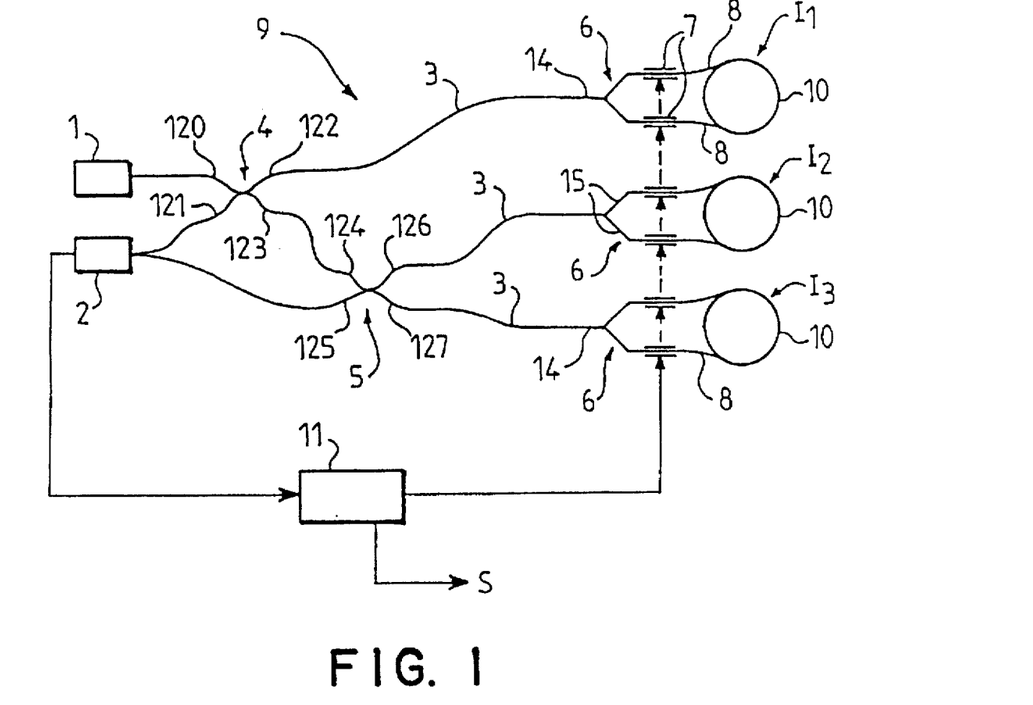
FIG. 1 shows a three-axis gyroscope according to the invention.
Figure 2:
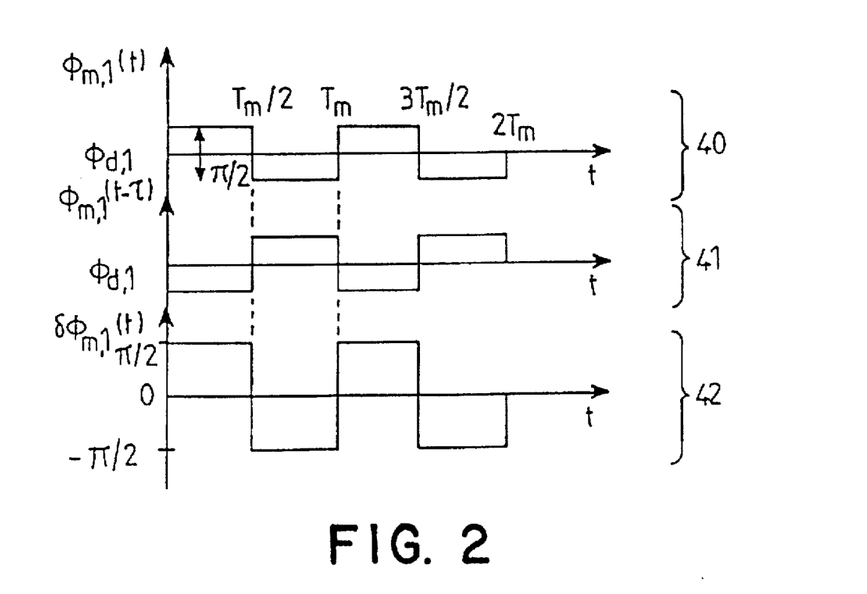
FIG. 2 shows variations with time of a biasing phase shift applied using the process according to the invention in a first gyroscope interferometer in FIG. 1, of the same phase shift translated by the transit duration, and the generated biasing phase difference.

The interferometric gyroscope with three measurement axes according to one embodiment of the invention shown in FIG. 1, comprises a light source 1, a photodetector 2, three interferometers $I_1$, $I_2$ and $I_3$, and fiber couplers 4 and 5. The light source 1 is typically a superluminescent diode (SLD), but may also consist of a fiber source doped with a rare earth or a superfluorescent source. Photodetector 2 is connected to an electronic processing unit 11. Each of the three interferometers $I_1$, $I_2$ and $I_3$ comprises a single-mode optical fiber multi-turn coil 10. The lengths of the three coils 10 are approximately equal such that a light signal passing through them has the same transit duration τ. The combined rotations of the three coils 10 must be measured by the optical gyroscope 9. Interferometers $I_1$, $I_2$ and $I_3$ each comprise an integrated optical Y junction 6 comprising a central guide 14 separating into two branch guides 15. Branch guides 15 are connected to the ends 8 of fiber coils 10. A phase modulator 7 is placed on each of the branch guides 15 of the optical Y junctions 6. The two fiber couplers 4 and 5 are couplers with two input gates 120, 121, 124, 125, and two output gates 122, 123, 126, 127, called "2×2" couplers.

The first coupler 4 has an input gate 120 connected to light source 1, and the second input gate 121 connected to photodetector 2. The first of its output gates 122 is connected to the central guide 14 of the Y junction 6 on the first interferometer $I_1$. Its second output gate 123 is connected to one of the two input gates 124 on the second coupler 5. All links are made by optical fibers 3. The second coupler 5 has an input gate 124 connected to the output gate 123 on the first coupler 4, the second input gate 125 is connected to photodetector 2 and its two output gates 126 and 127 are connected to the two interferometers $I_2$ and $I_3$ respectively, being connected to the central guides 14 and their Y junctions 6.

The first coupler 4 is a ⅓, ⅔ coupler also called 4.8 dB coupler, distributing an incident power originating from source 1, one third to the output gate 122 to interferometer $I_1$, and two thirds to output gate 123 towards the second coupler 5.

The second coupler 5 is a ½, ½ coupler, also called a 3 dB coupler, distributing an incident power originating from first coupler 4 into two equal parts of power at output gates 126 and 127. This configuration can present the same power to each of the three coils 10, such that photodetector 2 receives equal powers from each of the three interferometers $I_1$, $I_2$, $I_3$.

If an SLD is used as light source 1, the light is polarized and it is preferable to use couplers 4, 5 maintaining polarization.

In operation, a power signal Ps is transmitted by source 1. Power equal to Ps/3 then reaches the first interferometer $I_1$ and the input gate 124 of the second coupler 5 receives power 2Ps/3. This power, 2Ps/3, is then also distributed between two interferometers $I_2$ and $I_3$, each of which receives power Ps/3. Denoting the powers output from the three interferometers $I_1$, $I_2$ and $I_3$ as $P_1$, $P_2$ and $P_3$ respectively, the power $P_D$ detected by photodetector 2 is as follows:

$$P_D = (2/3\, P_1 + 1/6\, P_2 + 1/6\, P_3) + (1/2\, P_2 + 1/2\, P_3)$$
$$= 2/3\, (P_1 + P_2 + P_3)$$

Therefore the total detected power $P_D$ is equal to two thirds of the sum of the powers output from interferometers $I_1$, $I_2$, $I_3$, in other words ⅔ of the power Ps emitted by source 1. Therefore the three coils 10 are illuminated with the same intensity and send balanced signals to the photodetector 2.

The electronic processing unit controls modulators 7 which apply controlled modulation phase shifts $\Phi_{c,i}$, corresponding to the chosen modulations and multiplexing.

In the configuration described, two modulators 7 located on guide branches 15 of a single Y junction 6 simultaneously apply an opposite phase shift. Therefore, the three controlled modulation phase shifts $\Phi_{c,1}$, $\Phi_{c,2}$ and $_{c,3}$ applied in the three interferometers $I_1$, $I_2$ and $I_3$ respectively, may be distinguished.

The processing unit 11 also receives signals originating from photodetector 2 that it demultiplexes and demodulates. Since coils 10 of interferometers $I_2$, $I_3$ are rotating, the processing unit 11 can thus extract the rotation speeds S of coils 10 from the received signals.

When operating in a closed loop, the received signals can be processed to adjust phase shifts $\Phi_{c,i}$ applied by modulators 7.

Controlled modulation phase shifts $\Phi_{c,i}$ comprise a biasing component $\Phi_{m,i}$ consisting of a periodic modulation and possibly a counter-reaction component $\Phi_{cr,i}$ for operation in closed loop. The biasing component $\Phi_{m,i}$ is the sum of an oscillation term $\Phi_{o,i}$ and a constant term $\Phi_{d,i}$ which has no effect on the phase difference $\delta\Phi_{m,i}$ generated by the phase shift $\Phi_{m,i}$. Therefore we have:

$$\Phi_{c,i} = \Phi_{m,i} + \Phi_{cr,i} = \Phi_{o,i} + \Phi_{d,i} + \Phi_{cr,i}$$

Transit durations in the various coils are approximately identical and equal to $\tau$. The result that the phase difference $\delta\Phi_{c,i}$ generated in the interferometer $I_i$ is the sum of a periodic biasing phase difference $\delta\Phi_{m,i}$ and possibly a counter-reaction phase difference $\delta\Phi_{cr,i}$ with:

$$\delta\Phi_{c,i}(t) = \delta\Phi_{m,i}(t) + \delta\Phi_{cr,i}(t) =$$

$$(\Phi_{o,i}(t) - \Phi_{o,i}(t-\tau)) + (\Phi_{cr,i}(t) - \Phi_{cr,i}(t-\tau))$$

The signals produced by interferometers $I_i$ may be multiplexed using oscillation terms $\Phi_{o,i}$ of biasing components $\Phi_{m,i}$.

In multiplexing according to the process in the invention, a standard modulation is done for each of the three interferometers $I_i$, but with an offset in time.

This multiplexing is shown in FIGS. 2 to 9. Modulators 7 of the interferometer $I_1$ apply the same biasing phase shift $\Phi_{m,1}$ to counter-propagating waves propagating in interferometer $I_1$ in coil 10. Its variation with time 40 represented in FIG. 2 consists of a modulation around the offset value $\Phi_{d,1}$, with period $T_m$, and amplitude $\pi/4$.

The modulation period $T_m$ is twice the common transit duration $\tau$. After propagating a wave in coil 10 of interferometer $I_1$, the biasing phase shift $\Phi_{m,1}$ of the wave has a variation with time 41 translated by the transit duration $\tau$ compared with the previous variation with time 40. Since period $T_m$ is equal to $2\tau$, the result is that the biasing phase difference $\delta\Phi_{m,1}$ generated by modulators 7 has a variation with time 42 shown in FIG. 2 consisting of a modulation around 0, with period $T_m$ and amplitude $\pi/2$.

The interference power $P_1$ in the interferometer $I_1$ is directly deduced from this variation 42. The variation 20 of the interference power P as a function of the phase difference $\delta\Phi$ of superimposed waves shown in FIG. 3, can be used to obtain a signal for a phase difference $\delta\Phi_{m,1}$ which is not a multiple of $\pi$, and maximum sensitivity when the phase difference $\delta\Phi_{m,1}$ is an odd multiple of $\pi/2$.

Figure 3:
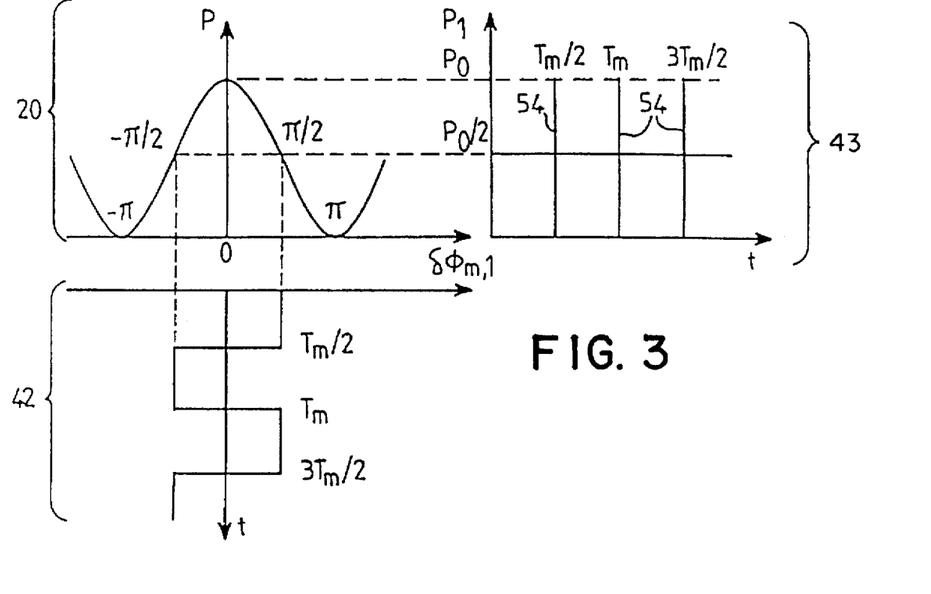
FIG. 3 shows the variation with time of the phase difference in FIG. 2, the variation of the interference power as a function of this phase difference and the variation of this power with time.

The variation with time 42 of the phase difference $\delta\Phi_{m,1}$ and the variation 20 of the power P as a function of the phase difference $\delta\Phi$, can be used to control the variation with time 43 of the interference power $P_1$ output from interferometer $I_1$.

Let $P_0$ be the maximum power obtained by two waves in phase, the variation 43 which has a period $T_m/2$ has a peak 54 with height $P_0$ at the beginning of each period, and will be equal to $P_0/2$ during each half-period $T_m/2$, as shown in FIG. 3.

When coil 10 on interferometer $I_1$ is rotating, a Sagnac phase shift $\delta\Phi_{s,1}$ proportional to the rotation speed S is added to the biasing phase difference $\delta\Phi_{m,1}$.

Figure 4:
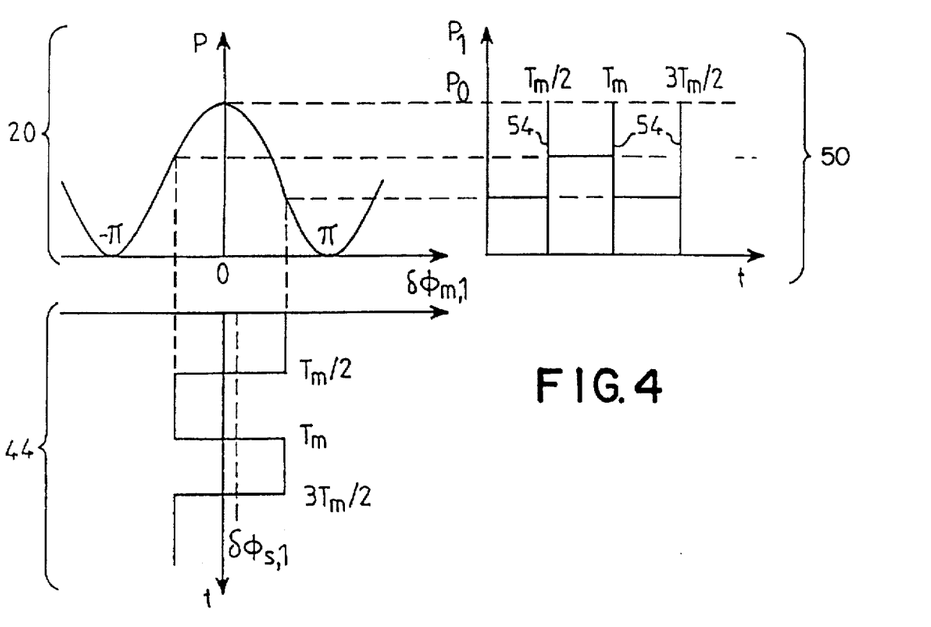
FIG. 4 shows the variation with time of the phase difference in FIGS. 2 and 3 modified by a Sagnac phase shift, the variation of the interference power according to the phase difference obtained and the variation of this power with time.

The variation with time 44 of the biasing phase difference $\delta\Phi_{m,1}$ when the interferometer $I_1$ coil 10 shown in FIG. 4 is rotating, is then offset by the phase shift $\delta\Phi_{s,1}$ with respect to the variation 42 that would have occurred with no rotation.

The variation with time 50, of the interference power $P_1$ output from interferometer $I_1$ is deduced using the variation 20 of the interference power P as a function of a phase shift $\delta\Phi$, in the same way as when there is no rotation, and is shown in FIG. 4.

It is found that this variation 24 has a period of $T_m$, and peaks 54 with height equal to $P_0$ at each half-period $T_m/2$, and alternates with minimum and maximum values equal to $P_0/2$ during the $T_m/2$ half-periods.

Knowing this signal, conventional methods can be used to determine the rotation speed of interferometer $I_1$ coil 10 using the power modulation obtained.

Figure 5:
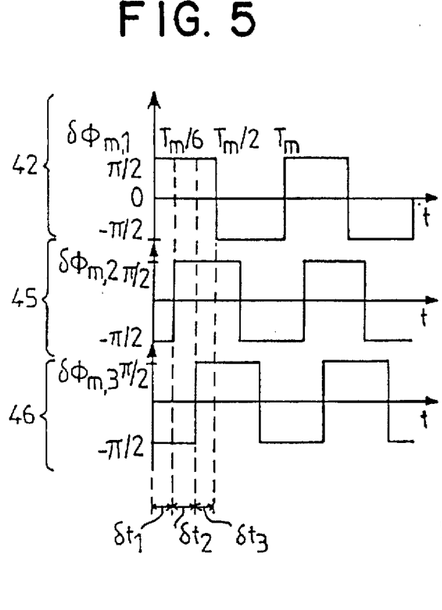
FIG. 5 shows variations with time of biasing phase shifts applied in each of the three gyroscope interferometers in FIG. 1, according to the process of the invention.

Biasing phase differences $\delta\Phi_{m,2}$ and $\delta\Phi_{m,3}$ generated in interferometers $I_2$ and $I_3$ respectively have variations with time 45 and 46 shown in FIG. 5 determined simply from the biasing phase difference $\delta\Phi_{m,1}$ generated in interferometer $I_1$ by time translations with durations $T_m/6$ and $T_m/3$ respectively. These phase differences $\delta\Phi_{m,2}$ and $\delta\Phi_{m,3}$ are obtained by applying biasing phase shifts $\Phi_{m,2}$ and $\Phi_{m,3}$ in interferometers $I_2$ and $I_3$, of which the variations with time (not shown) are deduced from the variation 40 of phase shift $\Phi_{m,1}$, using time translations of duration $T_m/6$ and $T_m/3$ respectively.

Thus according to this process, a clock duration $T_h$ equal to $T_m/6$ is used.

Each half-period $T_m/2$ is shared into three successive time intervals, $\delta t_1$, $\delta t_2$ and $\delta t_3$. During each period Th, only one of the biasing phase differences $\delta\Phi_{m,i}$ has a sign which is opposite to the other two. Interference powers $P_1$, $P_2$ and $P_3$ obtained at the output from interferometers $I_i$ are determined from the phase differences $\delta\Phi_{m,i}$.

Figure 6:
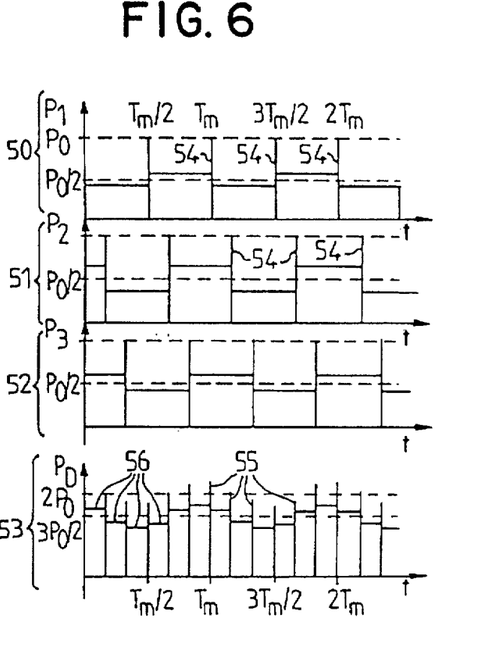
FIG. 6 shows variations with time, according to this first multiplexing mode, of interference powers obtained in each of the three interferometers in FIG. 1 in rotation, and the power received by the photodetector.

In the presence of Sagnac phase shifts $\delta\Phi_{s,i}$ due to rotations of interferometer $I_i$ coils 10, their variations with time 50, 51 and 52 represented in FIG. 6 consist of modulations of period $T_m$ centered about a value $P_0/2$, and with peaks 54 of height $P_0$ at the end of each $T_m/2$ half-period.

The three power modulations are each offset from the others by $T_m/6$. The result is that the power $P_D$ received by photodetector 2 from the three interferometers $I_i$, which is the sum of the three powers $P_1$, $P_2$ and $P_3$ multiplied by a factor of $\frac{2}{3}$, at all times takes account of the three modulations corresponding to the Sagnac phase shifts $\delta\Phi_{s,i}$ in each interferometer $I_i$, respectively.

Figure 10:
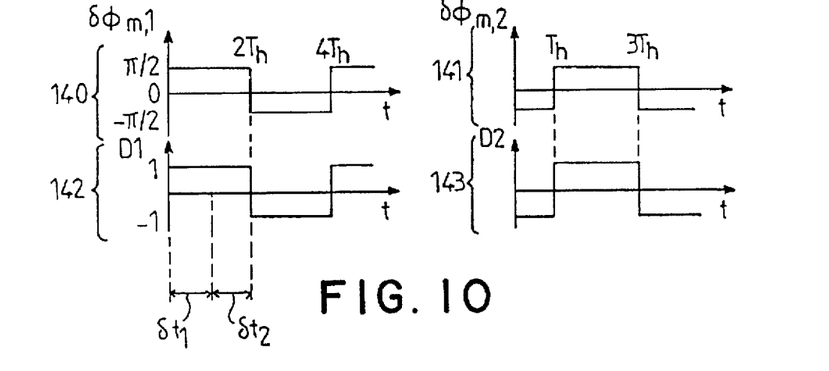
FIG. 10 shows the biasing phase differences using the process according to the invention, corresponding to demultiplexing and demodulation signals for a two-axis gyroscope.

The variation with time 53 of power $P_D$ shown in FIG. 10 is thus a function of the period $T_m$ with constant values 56 of duration $T_m/6$ and with height oscillating about the value $3P_0/2$ and peaks 55 appearing at the beginning of each constant value 56 and with height oscillating about the value $2P_0$.

Figure 7:
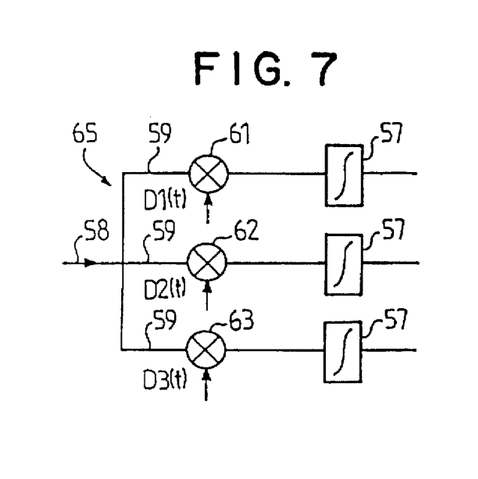
FIG. 7 shows a block diagram of the demultiplexing and demodulation circuit, corresponding to the three-axis gyroscope in FIG. 1 and multiplexing in FIG. 5.

Starting from the signal received by the processing unit 11 originating from photodetector 2, the signals output from the various interferometers $I_i$ can be recreated using an electronic demultiplexing and demodulation circuit 65 shown in FIG. 7. In the following, the term "demultiplexing" will be used to refer both to demultiplexing and to demodulation.

This circuit 65 comprises an input wire 58 dividing into three wires 59 on which three demultiplexing units 61, 62 and 63 and integrators 57 are provided. The demultiplexing units 61, 62 and 63 apply demultiplexing signals $D_1$, $D_2$ and $D_3$ respectively to the signals detected in wires 59.

Figure 8:
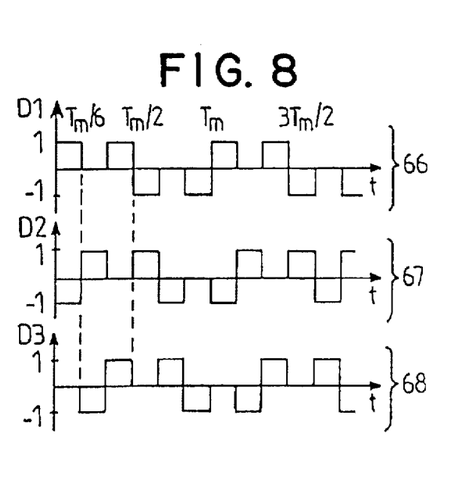
FIG. 8 represents the variations with time of the three demultiplexing and demodulation signals applied in the circuit in FIG. 7.

Variations with time 66, 67 and 68 in demultiplexing signals $D_1$, $D_2$ and $D_3$ respectively shown in FIG. 8, are used to recreate signals originating from interferometers $I_1$, $I_2$ and $I_3$ respectively. Since demultiplexing works in a closed loop, the signals $D_i$ can be normalized.

The variation 66 of signal $D_1$ is an odd function with period $T_m$ equal to 1 during the first third $T_m/6$ of half-period $T_m/2$, zero during the second third and 1 during the third third. Variations with time 67 and 68 of signals $D_2$ and $D_3$ are deduced from the variation 66 by time translations of duration $T_m/6$ and $T_m/3$ respectively.

Figure 9:
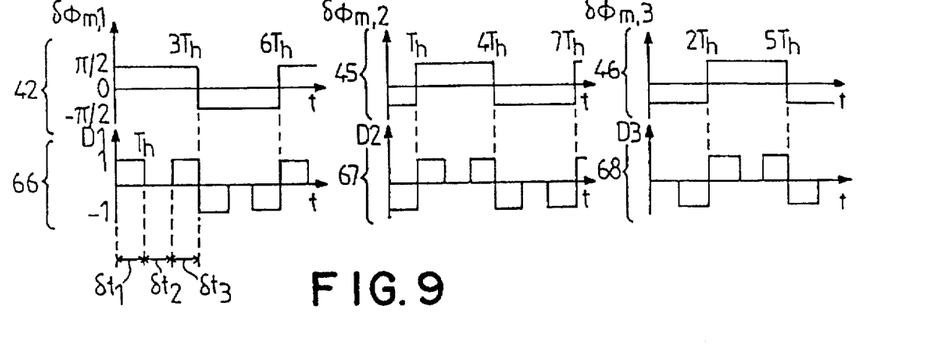
FIG. 9 shows the applied biasing phase difference and the demultiplexing and corresponding demodulation signal for each of the three interferometers in FIG. 1.

It is useful to make the biasing phase differences 42, 45 and 46 correspond to demultiplexing signals 66, 67, 68 as shown in FIG. 9. Each signal $D_i$ can simply be deduced from the associated phase difference $\delta\Phi_{m,i}$. The phase difference simply needs to be modified by normalizing it, and cancelling it during a clock period $T_h$ in the middle of each step.

The same multiplexing and demultiplexing procedure can easily be transferred to two measurement axes instead of three. The clock time $T_h$ is then equal to $T_m/4$ and defines two intervals $\delta t_1$ and $\delta t_2$ on each half-period $T_m/2$. Biasing phase differences $\delta\Phi_{m,1}$ and $\delta\Phi_{m,2}$ applied to the two axes shown in FIG. 10, are modulations in which the variations with time 140 and 141 are similar to those described previously 42, 45, 46. They are offset with respect to the other by the duration $T_h=T_m/4$. Demultiplexing signals $D_1$ and $D_2$ have variations 142 and 143 determined directly from the variations 140 and 141 of the phase differences, by a simple multiplying factor. The first demultiplexing signal $D_1$ is thus equal to 1 from 0 to $2T_h$, $-1$ from $2T_h$ to $4T_h$, while the second signal is equal to $-1$ from 0 to Th, 1 from $T_h$ to $3T_h$ and $-1$ from 3Tto $4T_h$. Therefore, they also correspond to standard modulations.

Figure 11:
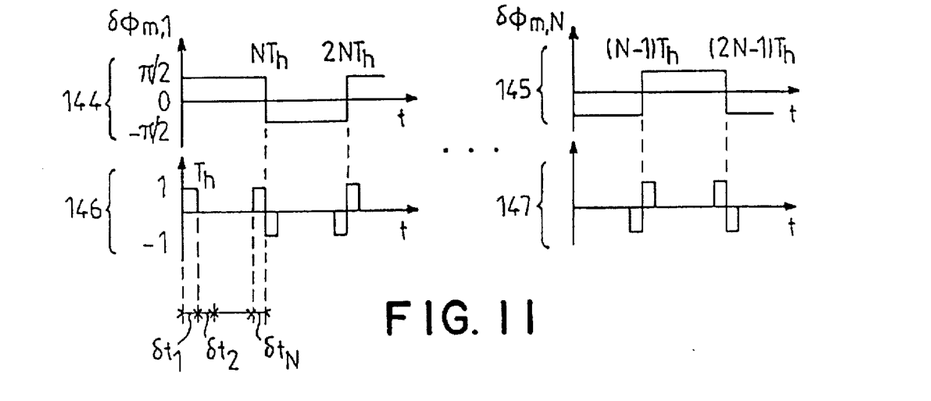
FIG. 11 shows biasing phase differences using the process according to the invention in correspondence with demultiplexing and demodulation signals, for a gyroscope with N measurement axes.

It is easy to generalize this process into an arbitrary number N of measurement axes. The clock time $T_h$ is then equal to $T_m/(2N)$ and defines N intervals $\delta t1, \delta t2, \ldots \delta tN$ on each half-period $T_m/2$. The N biasing phase differences $\delta\Phi_{m,1}$ applied to the N axes respectively, have variations with time 144, 145 successively offset by $T_h$ (FIG. 11).

The N demultiplexing signals $D_1, D_2, \ldots, D_N$ are determined from phase differences $\delta\Phi_{m,i}$ by a simple matrix inversion. Their variations with time 146, 147 (FIG. 11) are obtained from variations with time 144, 145 of the phase differences normalized to 1, by cancelling them out for $(N-2)$ clock periods $T_h$ in the middle of each step. The $i^{th}$ demultiplexing signal $D_i$ is thus equal to 1 during interval $\delta t_i$, 0 from $\delta t_{i+1}$ to $\delta t_{N+i-2}$, 1 during $\delta t_{N+i-1}$, $-1$ during $\delta t_{N+i}$, 0 from $\delta t_{N+i+1}$ to $\delta t_{2N+i-2}$ and $-1$ during $\delta t_{2N+i-1}$.

The demultiplexing thus carried out is very simple to implement numerically with digital electronics after analog-digital conversion of the photodetector 2 signal at each interval $\delta t_i$.

Measurement of rotations can be improved by operation in closed loop, itself well known. Modulators 7 on each interferometer $I_i$ then apply counter-reaction phase shifts $\Phi_{cr,i}$ which are added to the biasing phase shift $\Phi_{m,i}$ to create controlled modulations phase shifts $\Phi_{c,i}$. The variation with time 35 typical of this type of phase shift $\Phi_{cr}$ represented in FIG. 12, consists of a sequence of phase ramps 38 with counter-reaction period $\tau_{cr}$ and height $2\pi$.

Figure 12:
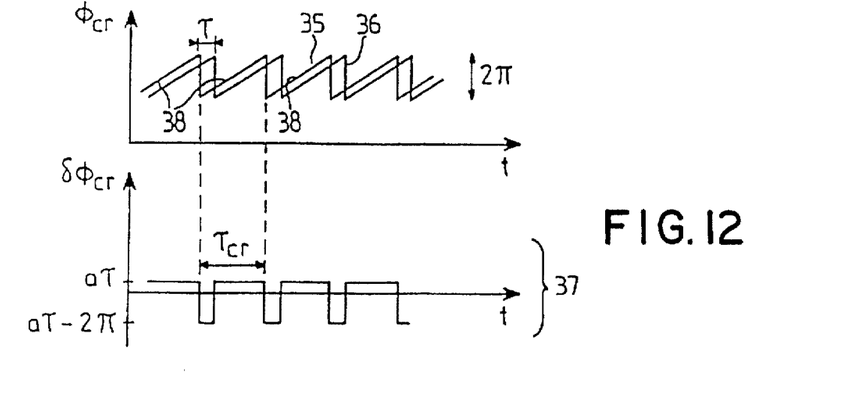
FIG. 12 represents variations with time of a counter-reaction phase shift applied in an interferometer, of the same phase shift translated by the transit duration, and the phase difference of the generated counter-reaction.

After passing through coil 10 of one of the interferometers $I_i$, the variation with time 36 of the counter-reaction phase shift $\Phi_{cr}$ is translated by a duration $\tau$, as shown in FIG. 12. Let the slope of phase ramps 38 be equal to a, then the counter-reaction phase difference $\delta\Phi_{cr}$ generated by modulators 7 has a step function for the variation with time 37 such that the phase difference $\delta\Phi_{cr}$ is continuously equal to $a\tau$, multiplied by a factor of $2\pi$.

The servocontrol thus achieved makes it easy to deduce the rotation speed S of the corresponding coil 10 easily from a, or more directly from the frequency at which phase ramps 38 drop.

This closed loop operation is perfectly stable, and interactions between signals output from each of the interferometers $I_i$, due particularly to their return to source 1 which modulate the source, are compensated by the servocontrol.

Although it is particularly advantageous to choose a phase bias equal to $\pi/2$, any other value which is not a multiple of $\pi$ can be chosen.

Furthermore, although it is particularly practical to partition the period $T_m$ into time intervals $\delta t_i$ of the same duration, particularly due to their coincidence with the clock time $T_h$, it would be possible to use time intervals $\delta t_i$ with distinct durations, the essential point being to obtain a partition of the period $T_m$.

Multiplexing can also be combined by a shift in time with more complex modulation systems than the system given as an example. Thus it can be useful to use it with modulation with four states instead of steps, itself well known. Typically, this modulation has a periodic sequence of four phase biases $\pi/4, 3\pi/4, -3\pi/4, -\pi/4$, this specific case not being restrictive.

In most embodiments, transit durations τi in interferometer $I_i$ coils 10 are only approximately equal with the same transit duration τ. The modulation period $T_m$ is then chosen to be equal to 2τ, which is twice this transit duration τ.

Differences between these lengths cause bias errors which form a major difficulty in using the multiaxis gyroscope 9.

Figure 13:
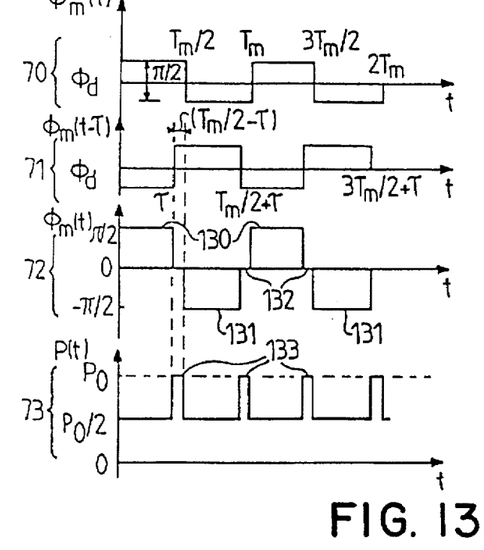
FIG. 13 shows the variations with time of a biasing phase shift applied in an interferometer, of its translation for the transit duration, of the corresponding biasing phase difference and the interference power when the modulation period is slightly greater than the transit duration.

In an interferometer $I_i$ with a transit duration τ and an associated modulator 7 applying to it a biasing phase shift $\Phi_m$ with period $T_m$ slightly greater than τ and amplitude $\pi/4$, an incident wave being submitted to this variation with time 70 of the phase shift $\Phi_m$ as shown in FIG. 13, there is a biasing phase shift $\Phi_m(t-\tau)$ at the output of interferometer $I_i$ coil 10, which has a variation with time 71 translated by a duration τ from the variation with time 70 of the applied phase shift $\Phi_m(t)$.

The result is that the biasing phase difference $\Phi_m$ obtained at the output from interferometer $I_i$, has a variation with time 72 corresponding to a modulation with period $T_m$ and amplitude $\pi/2$, centered about zero, in the same way as if there is no bias error.

However between the upper levels 130 and lower levels 131 forming the modulation, there are levels 132 with 0 phase shift and duration $(T_m/2)-\tau$. The result is that the variation with time 73 of the interference power due to the biasing phase difference $\Phi_m$ is no longer a stationary variation of height $P_0/2$ interrupted by power peaks 54 of height $P_0$ at a rate of $2/T_m$, as it is when there is no biasing error, but varies in steps 133 with duration $(T_m/2)-\tau$, with the same height and the same rate as the previous peaks 54.

This power variation 73 does not obviously reduce the accuracy of measurements made using Sagnac phase shifts $\delta\Phi_n$ representative of rotation speeds S of interferometer $I_i$ coils 10. In fact, all that matters is the difference between the two signals obtained with a time shift of a half-period corresponding to the difference $P(t)-P(t+T_m/2)$. This difference is not affected by steps 133 of the variation P(t).

Figure 14:
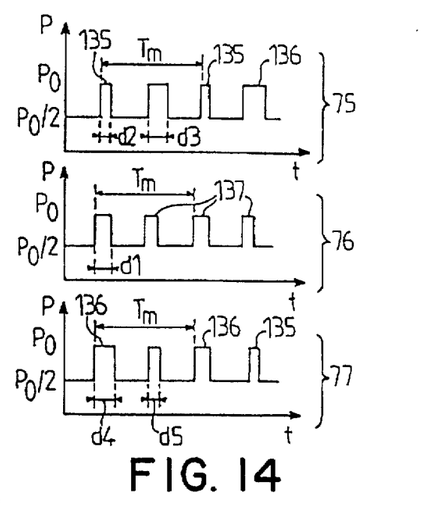
FIG. 14 shows variations with time of the interference power in the case of an asymmetric modulation, when the modulation period is respectively greater than, equal to and less than twice the transit duration.

Unfortunately in practice, this square signal is not perfectly symmetrical, particularly due to the rise and fall times which are generally different. In the presence of this type of asymmetric square modulation, variations with time 75, 76 and 77 of interference powers, represented in FIG. 14, show step functions 135, 136, 137 at a rate of $2/T_m$.

When the modulation period $T_m$ is equal to twice 2τ the transit duration τ, the variation with time 76 of the power P includes steps 137 with the same duration d1, this duration being dependent on the asymmetry of the modulation. When the modulation period $T_m$ is greater than twice $2\tau$ the transit duration $\tau$, the asymmetry of the modulation creates an alternation of steps 135 and 136 in the variation of the interference power with time, 75, with lower $d_2$ and higher $d_3$ durations respectively. Therefore the response will no longer have a period of $T_m/2$, and the differences obtained will make the results inaccurate.

A similar phenomenon occurs when the modulation period $T_m$ is less than twice $2\tau$ the transit duration $\tau$. An alternation of the steps 136 and 135 with higher $d_4$ and lower $d_5$ durations respectively are then observed on the frequency variation 77 of the interference power.

Let Df be the frequency difference from the natural frequency $1/(2\tau)$ of the interferometer $I_i$ coil 10, in other words $Df=(1/T_m-1/(2\tau)).2\tau$. It can be shown that the average bias in radian thus created is equal to $2\pi Df$. The relative variation of the natural frequency $1/(2\tau)$ as a function of temperature is of the order of 10 ppm per Kelvin.

This then gives an error of the order of $10^{-3}$ radians on the 100K specified thermal band, which is well beyond the requested order of $10^{-6}$ or $10^{-7}$ radians.

Bias errors obtained after demodulation at a period $T_m/2$ are mainly concentrated on steps 135, 136, 137 with short durations $d_1$, $d_2$, $d_3$, $d_4$, $d_5$.

According to a preferred embodiment of the invention, the electronic processing unit 11 comprises a periodic signal processing gate with a period $T_m/2$. This method shown in FIG. 15 thus consists in eliminating time intervals of duration $d_6$ making up a periodic gate 80, in the variation with time 83 of the interference power received in processing unit 11. Time sampling periods used in processing unit 11 are thus chosen outside these tame intervals.

Figure 15:
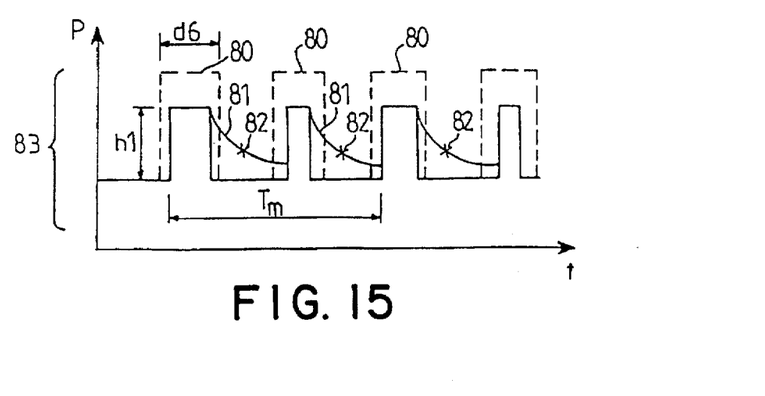
FIG. 15 represents the variation with time of the interference power in the case of asymmetric modulation with a modulation period greater than twice the transit duration, in the presence of a synchronous gate.

When multiplexing by extinction at $\pi$, or by an offset in time, peaks 33, 55 obtained in response signals 32, 53 received by photodetector 2 appear at a rate of $6/T_m$. Therefore the electronic processing gate 80 used to filter bias errors has a period of $T_m/6$.

More generally, multiplexing with N interferometers $I_i$ would require a gate with period $T_m/N$.

Although this gate is efficient, it does not eliminate some faults. In particular, since the signals do not drop at infinite slope, exponential decays 81 occurring at different times have to be taken into account, and therefore the height h1 depends on the total power Ps emitted by the source, as can be seen in FIG. 15. Therefore the values of sampling points 82 chosen on the curve showing the variations of power with time 83, are therefore distorted by exponential decays 81.

In order to minimize this effect, it is useful to switch source 1 off at each time peak 33, 55, in order to minimize as far as possible the height h1 of exponential decays 81.

Figure 16:
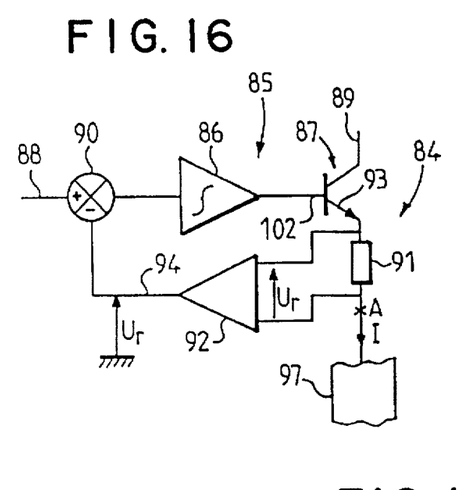
FIG. 16 shows a block diagram of a variable low noise light source.
Figure 17:
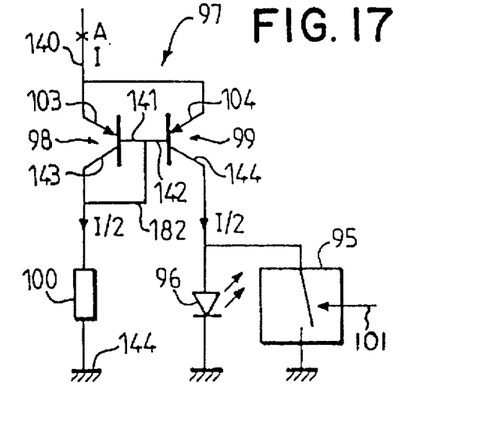
FIG. 17 shows a diagram of a current mirror and the modulated source of the circuit shown in FIG. 16.

This is done using an electronic modulation circuit 84 similar to that shown on the block diagrams in FIGS. 16 and 17. This electronic circuit 84 consists of a logic gate 95 coupled to a low noise current generator 85 through a current mirror 97. The logic gate 95 is connected in parallel with a superluminescent diode 96 acting as a light source 1. This logic gate 95 applies a modulation to U 101 which may or may not short circuit SLD 96. The current is supplied to this circuit 95, 96 through a low noise current generator 85 receiving current through an input 89.

The light intensity emitted by SLD 96 is directly dependent on the current passing through it. This is why the noise level on current generator 85 must be kept low. Typically, it must be less than 10 nA/√Hz on the 1 kHz–10 MHz band for a current of 80 mA, to remain below the photonic noise level on photodetector 2.

The low noise current generator 85 comprises an NPN transistor 87 with a current supply source 89, a connection 102 and an output 93 leading to the current mirror 97 passing through measurement resistor 91.

An end box 92 is connected in parallel to resistor 91, to give the voltage $U_r$ applied to the terminals of resistor 91, at output 94 of end box 92. This output 94 is connected to a comparator 90 comprising an input 88 through which a set value voltage is applied. The difference between the set value voltage and the voltage across resistance $U_r$ is transmitted by comparator 90 to an integrator 86. This integrator leads to transistor 87 connection 102.

During operation, the current with intensity I passing to SLD 96 is measured using resistor 91 that generates voltage $U_r$. This voltage is compared with the set value in comparator 90, and the difference between the two voltages controls integrator 86 that reacts on transistor 87 to servocontrol the value I of the current.

The cutoff frequency of this servocontrol is low to minimize noise, but is sufficient to compensate for other component temperature drifts. Transistor 87 supplies the current to resistor 91 while isolating it from the power supply. The noise of this power supply is thus filtered. Practice shows that noise levels less than 1 nA/√Hz can be achieved on the 1 kHz–10 MHz band for this type of circuit.

Use of logic gate 95 can give much shorter rise times lees than 10 ns which produce very little interference on power supplies. If a perfect current generator is used, the current output by the power supply is constant regardless of the state of gate 95.

However, this circuit cannot be used with the low noise generator 85, since load variations caused by modulation 101 disturb the current generator 84.

The current mirror 97 is used to overcome this difficulty in the load variation during modulation 101. The current mirror is connected to resistor 91 from a point A. Its advantage is that the load as seen from point A is fixed independently of any modulation, The current mirror 97 includes 2 PNP transistors 98 and 99, each including two inputs 103 and 104, two outputs 143 and 144 and two connections 141 and 141 connected to each other respectively. The input lead 140 in the current mirror 97 originating from point A is divided into two connected to inputs 103 and 104 on transistors 98 and 99. The output 143 of transistor 98 is connected to a resistor 100 connected to earth 144. Output 144 on the second transistor 99 is connected to the source modulation circuit 95, 96. A wire 182 connects the junction of connections 141, 142 on transistor 98 and 99, to transistor 198 output 143.

During operation, the branch formed by transistor 98 and resistor 100 has a fixed charge, since transistor 98 is installed like a diode, the two transistors 98 and 99 being equivalent. Since the base voltages of the two transistors 98 and 99 are equivalent, the output current 144 of transistor 99 towards the source modulation circuit 95, 96 is identical to the output 143 from transistor 98 leading to resistor 100, independently of the load in the branch containing circuit 95, 96.

An incident current with intensity I arriving at current mirror 97 starting from point A is therefore split into two currents each equal to I/2 passing through resistor 100 and to circuit 95, 96 respectively.

The presence of the current mirror 97 between source modulation devices 95, 96 and the low noise current generator 85 thus means that a very low noise and quickly modulable light source 1 can be obtained. Radiation of parasites on power supplies due to modulation of generator 85 are thus corrected.

With this electronic modulation circuit 84, it is found that the noise level is independent of the modulation 101 applied to SLD 96. It is also found that the current passing through SLD 96 typically has a rise time of the order of 20 ns for a step height of 80 mA. Since electro-optical phenomena are significantly faster than electronic phenomena, the optical power output by SLD 96 has the same profile as the current passing through it.

Many other types of multi-axial optical gyroscopes using identical multiplexing processes could be designed, based on the same principle as described above.

Figure 18:
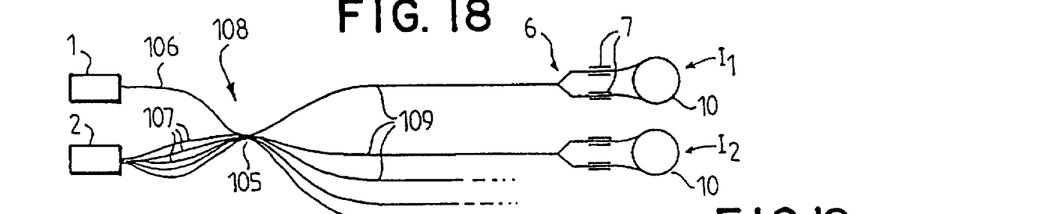
FIG. 18 shows a second embodiment of a multi-axial gyroscope according to the invention.

In particular, according to an alternative embodiment of the multi-axial optical gyroscope shown in FIG. 18, N interferometers $I_i$ may be used. This optical gyroscope 108 comprises a light source 1, a photodetector 2 and interferometers $I_i$, each comprising optical Y junctions 6, fiber coils 10 and being equipped with modulators 7, as in the first embodiment.

In this alternative embodiment, a single coupler 105 is used with N input gates 106, 107 and N output gates 109, one input gate 106 being connected to source I and the other N−1 input gates 107 being connected to photodetector 2, and the N output gates 109 being connected to interferometers $I_i$ respectively.

The number of interferometers $I_i$ can also be made greater than three, by using 2×2 couplers exclusively. Exclusive use of 2×2 couplers in particular means that the polarization of the light may be kept unchanged.

Figure 19:
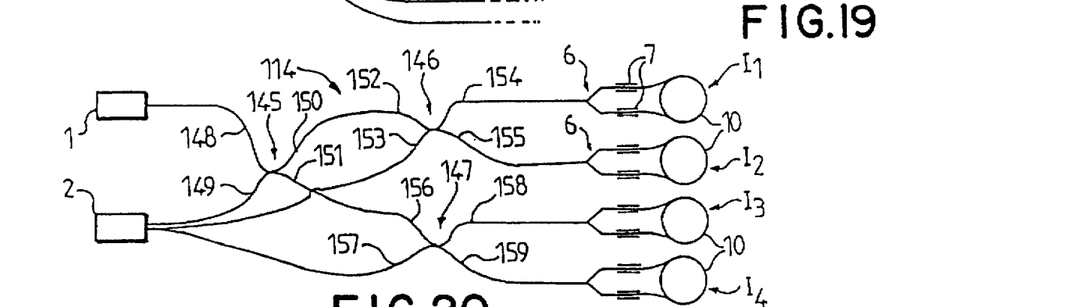
FIG. 19 shows a third embodiment of a multi-axial gyroscope according to the invention, with four measurement axes.

Thus another embodiment of the optical gyroscope according to the invention shown in FIG. 19 relates to a gyroscope with four measurement axes.

Gyroscope 114 according to this other embodiment comprises a light source 1, a photodetector 2 and four interferometers $I_i$ containing the same components as the previous gyroscope.

Gyroscope 114 comprises three ½, ½ couplers, 145, 146 and 147. A first coupler 145 has an input gate 148 connected to source 1 and an input gate 149 connected to photodetector 2. The first of its output gates 150 is connected to a second coupler 146, and the second output gate 151 is connected to the third coupler 147. The two couplers 146 and 147 are located symmetrically in the circuit.

An input gate 152 on coupler 146 is connected to the output gate 150 in the first coupler 145, the second input gate 153 on the second coupler 146 being connected to photodetector 2. The two output gates 154 and 155 on the second coupler 146 are connected to the two interferometers $I_1$ and $I_2$ respectively. An input gate 156 on the third coupler 147 is connected to output gate 151 on the first coupler 145, an input gate 157 is connected to photodetector 2 and the two output gates 158 and 159 are connected to the two other interferometers $I_3$ and $I_4$ respectively.

This circuit is designed so that powers reaching the four interferometers $I_i$ are identical and that signals received by photodetector 2 from these interferometers $I_i$ are balanced.

The two previously described multiplexing methods are directly applicable to this gyroscope 114 according to the invention.

In addition to the many possibilities available by making a gyroscope according to the basic principle of the invention, several of these gyroscopes can be coupled together, or to other different types gyroscopes.

Figure 20:
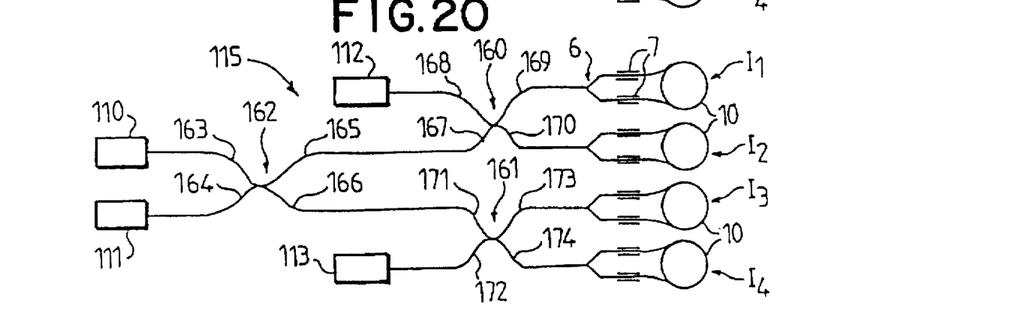
FIG. 20 shows a block diagram of a gyroscope with four measurement axes, combining two 2-axis gyroscopes according to the invention.

One possible technique shown in FIG. 20 consists of a gyroscope 115 combining two gyroscopes each with two measurement axes in accordance with the previous description. Therefore this configuration with four measurement axes comprises two light sources 110 and 111, two photodetectors 112 and 113 and four interferometers $I_i$.

Gyroscope 115 comprises three 2×2 couplers, 160, 161 and 162, with couplers 160 and 161 acting symmetrically. The two input gates 163 and 164 of a power supply coupler 162 are connected to light sources 110 and 111 respectively. Its output gates 165 and 166 are connected to the input gates 167 and 171 of the other two couplers 160 and 161 respectively. The first coupler 160 connecting with interferometers $I_i$ has an input gate 167 connected to the output gate 165 on coupler 162, its second input gate 158 is connected to the first photodetector 112 and its two output gates 169 and 170 connected to two of the interferometers $I_1$ and $I_2$ respectively. The second coupler 161 connecting with interferometers $I_i$ has an input gate 171 connected to the output gate 166 of coupler 162, its second input gate 172 being connected to the second photodetector 113, and its two output gates 173 and 174 connected to the other two interferometers $I_3$ and $I_4$ respectively.

Use of the ½, ½ coupler can also balance energies sent to interferometers $I_i$ and received by photodetectors 112, 113 from these interferometers $I_i$.

Compared with the previous embodiment, this will require two electronic processing units rather than one. The two previously described types of multiplexing are perfectly applicable separately to interferometer assembly $I_1$, $I_2$, and to interferometer assembly $I_3$, $I_4$.

This thus leads to a two by two multiplexing scheme with redundancy.

What we claim is:

1. Process for measurement of rotation speeds about N axes, where N is not less than 2, using a fiber optic interferometric gyroscope comprising N interferometers $I_i$ in Sagnac ring, two counter-propagating waves propagating in each of the said interferometers $I_i$, the wave propagation time between their separation and recombination being $\tau_i$, the said duration $\tau_i$ associated with interferometers $I_i$ being approximately equal to a common transit duration $\tau$, the said process being such that:

signals are emitted by a common light source to all interferometers $I_i$, the said signals are detected after passing through interferometers $I_i$ in a common photodetector, phase modulators generate controlled modulation phase differences $\delta\Phi_{c,i}$ between the counter-propagating waves propagating in each of interferometers $I_i$, modulators are controlled, signals originating from the photodetector are demultiplexed and demodulated, and rotation speeds of interferometers $I_i$ are extracted by a processing unit, the said signals emitted by the source reaching all interferometers $I_i$, then photodetector, almost simultaneously, wherein the said controlled modulation phase differences $\delta\Phi_{u,i}$ generated by modulators comprise biasing components $\delta\Phi_{m,i}$ with a common modulation period $T_m$ approximately equal to twice $2\tau$ the common transit duration $\tau$, and with common amplitude equal to a phase bias that is not a multiple of $\pi$, the value of each biasing component $\delta\Phi_{m,i}$ at time t being opposite to the value of the said component at time $t+T_m/2$, each half-period $T_m/2$ being divided into at least N time intervals 67 $t_i$ and wherein a sign change is produced in the biasing component $\delta\Phi_m$ associated with each interferometer $I_i$ at the beginning of one and only one time interval $\delta t_i$, such that a signal arriving at the processing unit is affected simultaneously by Sagnac phase shifts $\delta\Phi_{s,i}$ representing rotation speeds of the set of interferometers $I_i$, and is added to the modulation phase differences $\delta\Phi_{c,i}$, the said Sagnac phase shifts $\delta\Phi_{s,i}$ being extracted by the processing unit by sampling the said signal on the N $\delta t_i$ time intervals $\delta t_i$.

2. Measurement process according to claim 1, wherein in order to demultiplex and demodulate the said signals from the photodetector, demultiplexing and demodulation signals $D_i$ with periods equal to the common modulation period $T_m$ are applied through an electronic demultiplexing and demodulation circuit in the processing unit, such that the demultiplexing and demodulation signal $D_i$ associated with each interferometer $I_i$ is equal to 1 for the time interval $\delta t_i$ for the corresponding sign change, 0 from the next $\delta t_{i+1}$ interval to the (N−2)th $\delta t_{N+i-2}$ interval following, 1 in the next (N−1)th $\delta t_{N+i-1}$ interval, −1 in the next Nth $\delta t_{N+i}$ interval, 0 from the (N+1)th $\delta t_{N+i+1}$ interval to the (2N−2)th $\delta t_{2N+i-2}$ interval following, and −1 in the next (2N−1)th $\delta t_{2N+i-1}$ interval.

3. Measurement process according to claim 1, wherein the said controlled modulation phase difference $\delta\Phi_{c,i}$ generated in each interferometer $I_i$ is produced by modulators by simultaneously applying the same controlled modulation phase shift $\Phi_{c,i}$ to the two counter-propagating waves propagating in the said interferometer $I_i$, the said counter-propagating waves recombining after a time shift equal to the transit duration $\tau$, the said phase shift $\Phi_{c,i}$ determining the said phase difference $\delta\Phi_{c,i}$, the said modulation phase shift $\Phi_{c,i}$ comprising a biasing component $\Phi_{m,i}$ with a period equal to the modulation period $T_m$, the said biasing component $\Phi_{m,i}$ being the sum of an oscillation term $\Phi_{o,i}$ and a constant offset term $\Phi_{d,i}$, the value of the said oscillation term $\Phi_{o,i}$ at time t being opposite to its value at time $t+T_m/2$, the said oscillation term $\Phi_{o,i}$ having an amplitude equal to half of the phase bias, and changing sign at the beginning of the said time interval $\delta t_i$ corresponding to the said interferometer $I_i$.

4. Measurement procedure according to claim 3 wherein the said phase bias is equal to $\pi/2$.

5. Measurement process according to claim 1, wherein the said time intervals $\delta t_i$ are equal and are 1/N of the said modulation period $T_m/2$.

6. Measurement process according to claim 5, wherein an output signal is applied that reaches the processing unit, a periodic signal processing gate, consisting of an amplitude modulation with a gate period equal to 1/(2N) of the modulation period $T_m$, leaving the said signal unchanged for part of each gate period centered on the said time intervals $\delta t_i$, and cancelling it during the other part of the said period, so as to attenuate parasite effects due to differences between the half-modulation period $T_m/2$ and natural periods $\tau i$ of interferometers $I_i$.

7. Measurement process according to claim 6, wherein a signal emitted by source is acted upon by an electronic modulation circuit connected to the said source, the said circuit applying to the signal a sequential extinction at an extinction period equal to 1/(2N) of the modulation period $T_m$, so as to attenuate parasite effects due to differences between the half-modulation period $T_m/2$ and the natural periods $\tau i$ of interferometers $I_i$.

8. Measurement process according to claim 1, wherein for each interferometer $I_i$, any Sagnac phase shift $\delta\Phi_{s,i}$ caused by rotation of the said interferometer $I_i$ and added to the biasing component $\delta\Phi_{m,i}$ of the associated controlled modulation phase difference $\delta\Phi_{c,i}$ is compensated by a counter-reaction component $\delta\Phi_{cr,i}$ equal to the modulation phase difference $\delta\Phi_{c,i}$, the sum $\delta\Phi_{s,i}+\delta\Phi_{cr,i}$ of the Sagnac phase shift $\delta\Phi_{s,i}$ and the counter-reaction component $\delta\Phi_{cr,i}$ being continuously servocontrolled to zero, such that the said interferometer rotations $I_i$ are deduced from the counter-reaction components $\delta\Phi_{cr,i}$.

9. Interferometric gyroscope with optical fiber used to measure rotation speeds about N axes, where N is not less than 2, comprising:

N interferometers $I_i$ in Sagnac ring, two counter-propagating waves propagating in each of the said interferometers $I_i$, the propagation time for the waves between their separation and recombination having a transit duration $\tau i$, the said durations $\tau i$ associated with interferometers $I_i$ being approximately equal to a common transit duration $\tau$, a common light source, a common photodetector, phase modulators generating controlled modulation phase differences $\delta\Phi_{c,i}$ between the counter-propagating waves propagating in each of the interferometers $I_i$, a processing unit controlling the said modulators, receiving signals from the photodetector, demultiplexing and demodulating the said signals, and providing rotation speeds of the said interferometers $I_i$, wherein the said controlled modulation phase differences $\delta\Phi_{c,i}$ generated by the modulators comprise biasing components $\delta\Phi_{m,i}$ with a common modulation period $T_m$ practically equal to twice $2\tau$ the common transit duration $\tau$, and with a common amplitude equal to a phase bias which is not a multiple of $\pi$, the value of each biasing component $\delta\Phi_{m,i}$ at time t being opposed to the value of the said component at time $t+T_m/2$, each half-period $T_m/2$ being divided into at least N time intervals $\delta t_i$, and wherein the modulator for each interferometer $I_i$ produces a sign change in the associated biasing component $\delta\Phi_{m,i}$ at the beginning of one and only one of the time intervals $\delta t_i$, such that a signal arriving at the processing unit is simultaneously affected by Sagnac phase shifts $\delta\Phi_{o,i}$ representing rotation speeds of all interferometers $I_i$, and is added to the modulation phase differences $\delta\Phi_{c,i}$, the said Sagnac phase shifts $\delta\Phi_{s,i}$ being extracted by the processing unit by sampling the said signal on the N time intervals $\delta t_i$.

10. Gyroscope according to claim 9, further comprising a set of couplers connecting the source, the photodetector and interferometers $I_i$, said set of couplers having N input gates and N output gates, one input gate being connected to the source and N−1 input gates being connected to the photodetector and the N output gates being connected to the various interferometers $I_i$ respectively.

11. Gyroscope according to claim 10, wherein said set is a single coupler comprising N input gates and N output gates.

12. Gyroscope according to claim 10, wherein said couplers each have two input gates and two output gates and form a tree structured assembly.

13. Gyroscope according to claim 12, comprising two interferometers and one ½, ½ coupler, said ½, ½ coupler, sharing power incident on a first input gate connected to the source, into two powers transmitted to the two output gates connected to the two interferometers respectively, each being equal to half of the said incident power, such that the two interferometers each receive the same light power and that the signals output from said interferometers and received by the photodetector are balanced.

14. Gyroscope according to claim 12, comprising three interferometers and two couplers, the first of these couplers being a ⅓, ⅔ coupler and having two input gates, connected to said source and said photodetector respectively, one ⅓ output gate being connected to a first of said interferometers and another ⅔ output gate being connected to a first input gate of the second coupler, the second coupler being a ½, ½ coupler and having a second input gate connected to said photodetector and output gates connected to the other two interferometers respectively, the first ⅓, ⅔ coupler sharing the incident power on the input gate connected to the source in a first power transmitted to the output gate connected to the first interferometer equal to one third of said incident power, and in a second power transmitted to the output gate connected to the first input gate of the second coupler equal to two thirds of the said incident power, so that the three interferometers each receive the same light power and the signals output from said interferometers and received by the photodetector are balanced.

15. Gyroscope according to claim 9, wherein polarizers are inserted between the couplers and interferometers $I_i$.

16. Gyroscope according to claim 9, coupled to other gyroscopes.

17. Gyroscope according to claim 16, coupled to a second gyroscope, through a power supply coupler comprising two input gates and two output gates, the two input gates being connected to two light sources respectively of the combined gyroscope, and the two output gates being connected respectively to the two gyroscopes respectively, and sending optical signals to the gyroscopes.

* * * * *